July 11, 1972     K. REIF     3,676,011

LIQUID-SEALED CENTRIFUGAL PUMP

Filed March 27, 1970     2 Sheets-Sheet 1

INVENTOR.
KURT REIF

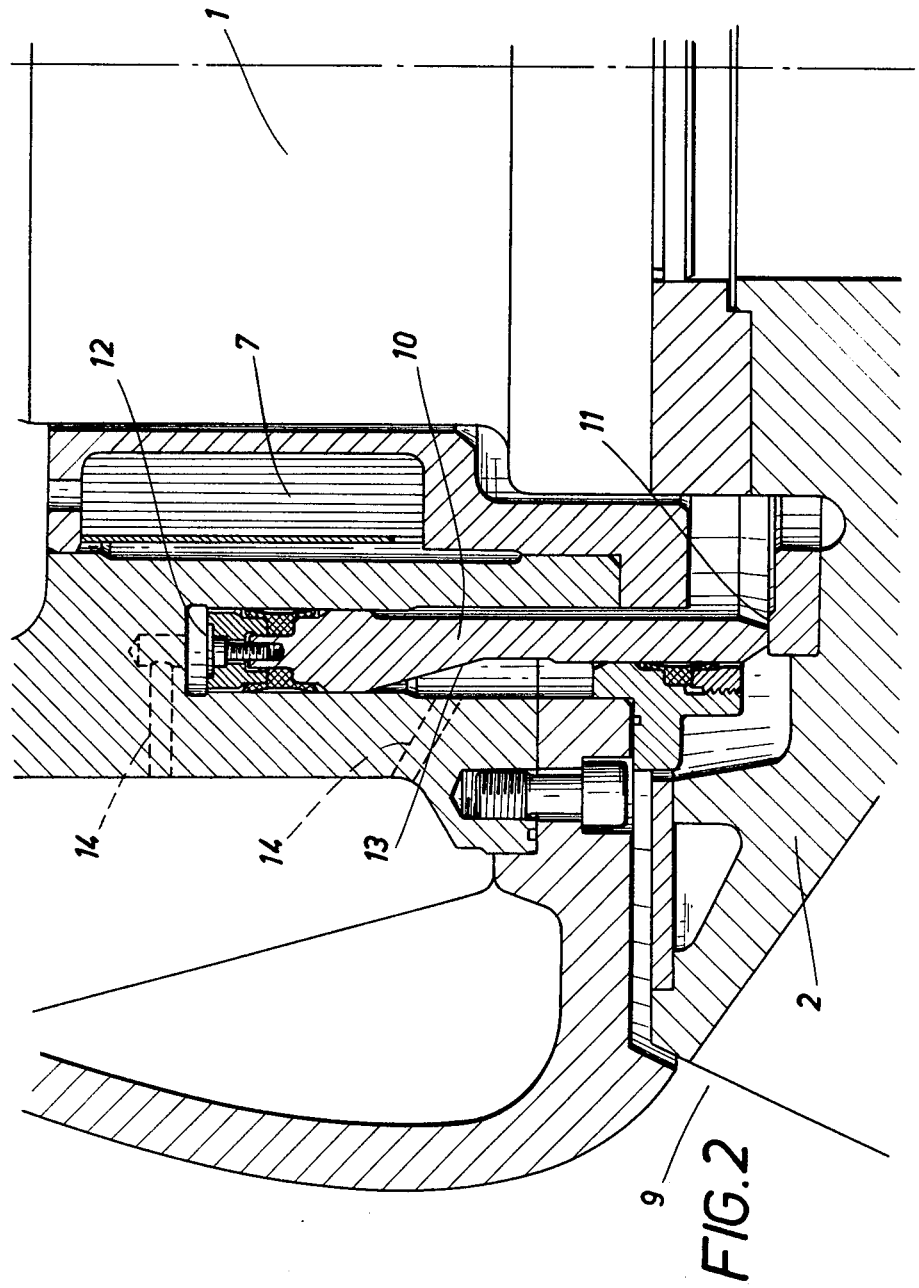

United States Patent Office
3,676,011
Patented July 11, 1972

3,676,011
LIQUID-SEALED CENTRIFUGAL PUMP
Kurt Reif, Graz, Austria, assignor to Maschinenfabrik
Andritz Actiengesellschaft, Graz-Andritz, Austria
Filed Mar. 27, 1970, Ser. No. 23,334
Claims priority, application Austria, Mar. 31, 1969,
A 3,132/69
Int. Cl. F01d 11/00
U.S. Cl. 415—111                    7 Claims

ABSTRACT OF THE DISCLOSURE

An impeller is secured to a rotatable shaft to rotate therewith. A shaft seal is arranged to seal said shaft on one side of said impeller. A guide bearing cooperates with said shaft and is disposed between said shaft seal and said impeller and arranged to permit of a leakage of a predetermined amount of liquid from said one side of said impeller into said receiving chamber when said impeller coasts to a stop from a rotation at a predetermined, normal speed in such a sense that liquid is delivered by said impeller on said one side thereof. A standstill seal is disposed between said guide bearing and said impeller and arranged to be open during a rotation of the impeller in said sense and to be closed when said impeller is stopped. Means are provided which define a receiving chamber that is disposed between and communicates with said shaft seal and said guide bearing and adapted to hold said predetermined amount of liquid. Means are provided to supply a sealing liquid to said receiving chamber.

---

Figure 1:
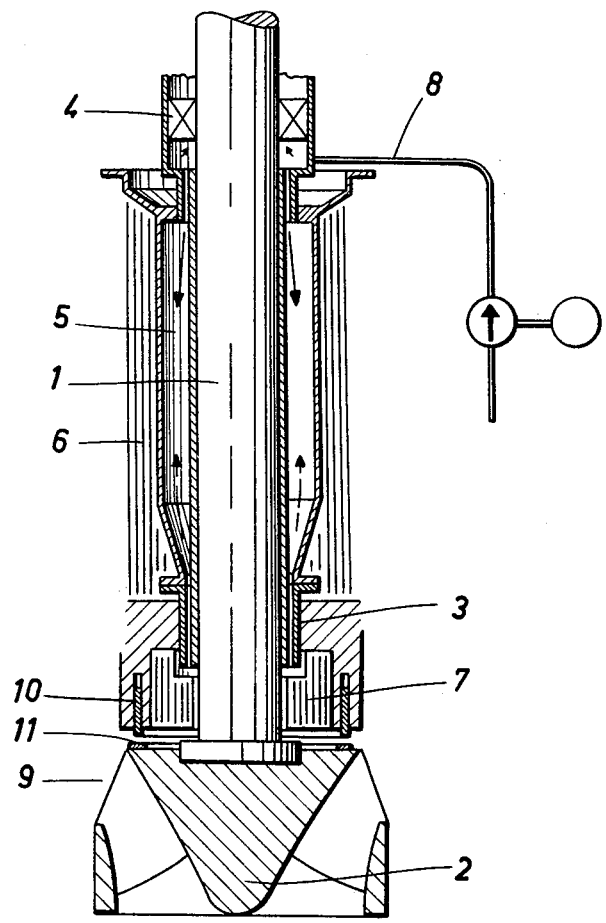

This invention relates to a sealing device for centrifugal pumps for handling liquid which is under a high pressure and at an elevated temperature, in which pumps a sealing liquid is supplied to the pump shaft seal on the side thereof which faces the impeller. Such pump may constitute, e.g., the main pump for the coolant cycle of a nuclear reactor.

The sealing liquid is at a relatively low temperature and under a somewhat higher pressure than the liquid which has been handled. Part of the sealing liquid flows through the shaft seal and the other part flows along the pump shaft through the inner guide bearing into the handling chamber of the pump. The sealing liquid serves to prevent an evaporation of liquid which would otherwise leak past the seal and to maintain the shaft seal at a relatively low temperature. If a defect results in a failure of the supply of sealing liquid and any stand-by system which is provided for this purpose fails too, the hot liquid which has been handled will be forced through the shaft seal under the high pressure to which it is subjected even when the pump is shut down. It is an object of the invention reliably to eliminate that danger.

It is already known to provide between the handling chamber of the pump and the shaft seal a sealing chamber, which is supplied with a compressed gas. When the supply of compressed gas fails in such arrangements, the liquid which has been handled can enter the sealing chamber and can quickly displace the compressible gas contained in the sealing chamber and can then enter the shaft seal. Besides, the handling of the compressed gas involves a fairly large structural expenditure. It is also known to provide a sealing oil cycle for the shaft seal of a pump for handling a gaseous fluid and to provide an elevated container, which supplies sealing oil to the shaft seal for some time when the sealing oil pump has failed. Such elevated container considerably adds to the structural expenditure and can be designed only for relatively low sealing pressures. It is an object of the invention to provide a sealing device which is of the kind described first hereinbefore and free of these disadvantages.

The invention accomplishes its objects by the provision of a receiving chamber, which is disposed between the inner guide bearing of the pump shaft and the shaft seal and which has a volume that is at least as large as that amount of the liquid which has been handled and which enters the receiving chamber through the guide bearing upon a failure of the supply of sealing liquid, and by the provision of a standstill seal, which closes automatically to seal the guide bearing from the handling chamber of the pump. Failure of the supply of sealing liquid results in an immediate de-energization of the drive means for the pump. The coasting time of the pump is so long, however, that a flow of the liquid which has been handled to the shaft seal could not be prevented, particularly because the standstill seal cannot be closed until the pump has come to a standstill. On the other hand, the receiving chamber is sufficiently large to take up all liquid which has been handled and which leaks toward the shaft seal through the guide bearing during the coasting of the pump. As a result, the liquid which has been handled is reliably kept from the shaft seal until the standstill seal has become effective.

In a development of the invention, a heat-lagging insulation is provided for the receiving chamber and possibly the region of the guide bearing. This will prevent a premature temperature rise of that part of the sealing liquid which leaks through the guide bearing into the handling chamber of the pump.

The invention provides also a branch conduit, which branches from the conduit for the liquid that has been handled and extends through an auxiliary cooler and in case of a failure of the supply of sealing liquid and of a standstill of the pump serves to supply liquid to the inside of the shaft seal. When the pump has coasted to a stop and the standstill seal is closed, cooled liquid that has been handled is then used as a sealing liquid so that even a slight leakage through the standstill seal cannot cause hot liquid to pass through the shaft seal.

A particularly desirable design will be obtained if the standstill seal consists of an annular piston, which is coaxial with the pump shaft and displaceable toward the rear side of the impeller and which cooperates with a sealing surface provided on the rear side of the impeller, said piston having two opposite end faces differing in area and adapted to be supplied alternatingly with sealing liquid or handled liquid whereas the respective other end face is pressure-relieved. When the standstill seal is in an open position, the piston end face which is remote from the impeller is pressure-relieved and sealing liquid is supplied to the piston end face which faces the impeller. Besides, the internal pressure of the pump then acts on the sealing surface of the annular piston so that the annular piston is kept spaced from the impeller. To close the standstill seal, the pressure of the sealing liquid is applied to that piston end face which is remote from the impeller and atmospheric pressure is applied to that piston end face which faces the impeller so that the latter end face is pressure-relieved. The piston end face which is remote from the impeller has such an area that the annular piston is forced against the opposite sealing surface on the rear side of the impeller in spite of the internal pressure of the pump acting on the sealing surface of the annular piston. The application of pressure is controlled by a control valve which is disposed outside the pump. Upon a failure of the supply of sealing liquid, the valve is automatically shifted so that liquid which has been handled is passed through an auxiliary cooler and supplied to the piston to operate the same because the liquid which has been handled is under pressure even when the pump is at a standstill. The fact that the effective piston faces differ in area enables a displacement of the piston against the internal pressure of the pump acting on the sealing surface of the piston.

The invention is shown by way of example in the accompanying drawing, in which

FIG. 1 is a diagrammatic sectional view showing the essential parts of a pump which is provided with a sealing device and FIG. 2 is an enlarged fragmentary axial sectional view showing as a detail a portion of a pump provided with the standstill seal.

The pump which is illustrated is intended for use as the main pump for the coolant cycle of a nuclear reactor. A pump shaft 1 carries an impeller 2 and comprises an inner guide bearing 3 and a shaft seal 4, which may consist, e.g., of a set of clearance seals. A receiving chamber 5 is provided between the guide bearing 3 and the shaft seal 4 and is surrounded by heat-lagging insulation 6. Additional insulation 7 is provided below the guide bearing 3. Sealing liquid is supplied through a conduit 8 to the side of the shaft seal 4 on the side thereof facing the impeller and is under a somewhat higher pressure than the liquid which has been handled. Part of the sealing liquid flows through the shaft seal and another part flows through the receiving chamber 5 and the guide bearing 3 into the handling chamber 9 of the pump.

The drive means for the pump are de-energized immediately in response to a failure of the supply of sealing liquid. Because the coasting of the pump to a stop takes considerable time, liquid which has been handled now rises through the guide bearing 3 into the receiving chamber 5. The latter is so large that it can take up all liquid which has been handled and which enters during the coasting of the pump and this liquid thus cannot reach the shaft seal 4. A standstill seal formed by an annular piston 10 is then closed to prevent a further ingress of liquid which has been handled. Liquid which has been handled is then taken from the discharge conduit and cooled and supplied to the inside of the shaft seal 4 so that a flow of hot liquid to the shaft seal will be prevented even when there is a certain leakage past the standstill seal 10.

FIG. 2 shows the standstill seal, which is formed by the annular piston 10, in its closed position, in which the piston 10 cooperates with a sealing surface 11 on the rear side of the impeller 2. The annular piston 10 comprises two opposite piston end faces 12, 13, which can be alternatingly subjected to pressure or pressure-relieved through bores 14. The application of pressure is controlled by a control valve, not shown, which is disposed outside the pump and connected to suitable conduits. In the closed position of the seal, the piston end face 12 is supplied with sealing liquid or, when the supply of sealing liquid has failed, with cooled liquid which has been handled, whereas the cylinder chamber adjoining the piston surface 13 communicates with the atmosphere.

What is claimed is:

1. A centrifugal pump, which comprises
   a rotatable shaft,
   an impeller which is secured to said shaft to rotate therewith,
   a shaft seal arranged to seal said shaft on one side of said impeller,
   a guide bearing cooperating with said shaft and disposed between said shaft seal and said impeller and arranged to permit of a leakage of a predetermined amount of liquid from said one side of said impeller into said receiving chamber when said impeller coasts to a stop from a rotation at a predetermined, normal speed in such a sense that liquid is delivered by said impeller on said one side thereof,
   a standstill seal, which is disposed between said guide bearing and said impeller and arranged to be open during a rotation of the impeller in said sense and to be closed when said impeller is stopped,
   means defining a receiving chamber which is disposed between and communicates with said shaft seal and said guide bearing and adapted to hold said predetermined amount of liquid and
   means operable to supply a sealing liquid to said receiving chamber.

2. A centrifugal pump as set forth in claim 1, in which said means defining said receiving chamber comprise heat-lagging insulation.

3. A centrifugal pump as set forth in claim 2, which comprises heat-lagging insulation surrounding said guide bearing.

4. A centrifugal pump as set forth in claim 1, which comprises
   a discharge conduit arranged to receive liquid which has been delivered by said impeller on said one side thereof,
   a cooler, and
   a branch conduit which extends through said cooler and communicates with said discharge conduit and said receiving chamber and is arranged to supply liquid from said discharge conduit to said receiving chamber when said means operable to supply a sealing liquid are inoperative and said impeller is stopped.

5. A centrifugal pump as set forth in claim 1, in which said standstill seal comprises an annular piston which is coaxial with said shaft and displaceable against said impeller and has first and second end faces differing in area and facing said impeller and guide bearing, respectively,
   said impeller has on said one side a sealing surface for sealing engagement with said first end face, and
   pressure-applying means are provided selectively to supply liquid under pressure to either of said end faces and to pressure-relieve the other one of said end faces.

6. A centrifugal pump as set forth in claim 5, in which said pressure-applying means are adapted to supply said sealing liquid to either of said end faces of said piston.

7. A centrifugal pump as set forth in claim 6, which comprises
   a discharge conduit arranged to receive liquid which has been delivered by said impeller on said one side thereof,
   a cooler, and
   a branch conduit which extends through said cooler and communicates with said discharge conduit and said receiving chamber and is arranged to supply liquid from said discharge conduit to said receiving chamber when said means operable to supply a sealing liquid are inoperative and said impeller is stopped,
   said pressure applying means being also adapted to supply liquid from said discharge conduit to said second end face when said means operable to supply a sealing liquid are inoperative and said impeller is stopped.

References Cited
UNITED STATES PATENTS

| | | | |
|---|---|---|---|
| 2,709,567 | 5/1955 | Wood | 415—111 |
| 3,398,929 | 8/1968 | Schreiber et al. | 415—111 |

CORNELIUS J. HUSAR, Primary Examiner